United States Patent
Cormier et al.

(10) Patent No.: US 9,572,016 B2
(45) Date of Patent: Feb. 14, 2017

(54) METHODS AND APPARATUS FOR USE IN TRANSFERRING AN ASSIGNMENT OF A SECURE CHIP BETWEEN SUBSCRIPTION MANAGERS

(71) Applicants: BlackBerry Limited, Waterloo (CA); Certicom Corp., Mississauga (CA)

(72) Inventors: Jean-Philippe Paul Cormier, London (GB); David Philip Hole, Southampton (GB); Nicholas James Russell, Newbury (JP); Daniel Francis O'Loughlin, Aptos, CA (US)

(73) Assignees: BlackBerry Limited, Waterloo, Ontario (CA); Certicom Corp., Mississauga, Ontario (CA)

( * ) Notice: Subject to any disclaimer, the term of this patent is extended or adjusted under 35 U.S.C. 154(b) by 0 days.

(21) Appl. No.: 14/921,299

(22) Filed: Oct. 23, 2015

(65) Prior Publication Data

US 2016/0044496 A1     Feb. 11, 2016

Related U.S. Application Data

(63) Continuation of application No. 13/543,099, filed on Jul. 6, 2012, now Pat. No. 9,173,085.

(51) Int. Cl.
*H04B 1/38* (2015.01)
*H04W 8/20* (2009.01)
(Continued)

(52) U.S. Cl.
CPC ............ *H04W 8/205* (2013.01); *H04L 9/3268* (2013.01); *H04L 63/0823* (2013.01);
(Continued)

(58) Field of Classification Search
CPC ........ H04W 88/06; H04W 12/06; H04W 8/18; H04W 60/005; H04W 8/04; H04W 60/06; H04W 12/10; H04W 12/02; H04W 12/08; H04W 40/36; H04W 88/16; H04W 8/06; H04W 8/12
(Continued)

(56) References Cited

U.S. PATENT DOCUMENTS 5,839,076 A   11/1998   Becher
7,130,998 B2  10/2006   Balfanz et al.
(Continued)

FOREIGN PATENT DOCUMENTS

TW   200533136   10/2005
TW   201108027   3/2011
(Continued)

OTHER PUBLICATIONS

Taiwan Search Report in Taiwanese Application No. 102123358, dated Jan. 28, 2015, 3 pages (with English Translation).
(Continued)

*Primary Examiner* — Kwasi Karikari
(74) *Attorney, Agent, or Firm* — Fish & Richardson P.C.

(57) ABSTRACT

Techniques for use in transferring an assignment of a secure chip of a wireless device from a current subscription manager (SM) of a current mobile network operator (MNO) to a new SM of a new MNO are described. In one illustrative example, the current SM receives a request for transferring the assignment and produces transfer permission data in response. The transfer permission data includes an identifier of the secure chip, an identifier of the current SM, and a digital signature of the current SM. The current SM then sends to the secure chip a transfer permission message which includes the transfer permission data. The transfer permission data indicates a permission for the secure chip to (Continued)

transfer the assignment from the current SM to the new SM. Additional techniques are performed by the secure chip, and the new SM, as described.

21 Claims, 7 Drawing Sheets

(51) Int. Cl.
  *H04W 8/18* (2009.01)
  *H04L 9/32* (2006.01)
  *H04L 29/06* (2006.01)
  *H04W 88/02* (2009.01)
  *H04W 12/06* (2009.01)

(52) U.S. Cl.
  CPC ......... *H04W 8/183* (2013.01); *H04L 2209/80* (2013.01); *H04W 12/06* (2013.01); *H04W 88/02* (2013.01)

(58) Field of Classification Search
  USPC .......................................................... 455/558
  See application file for complete search history.

(56) References Cited

U.S. PATENT DOCUMENTS

| | | | |
|---|---|---|---|
| 7,333,615 | B1 | 2/2008 | Jarboe et al. |
| 7,395,436 | B1 | 7/2008 | Nemovicher |
| 9,173,085 | B2 * | 10/2015 | Cormier ................ H04W 8/183 |
| 2003/0112977 | A1 | 6/2003 | Ray et al. |
| 2003/0163733 | A1 | 8/2003 | Barriga-Caceres et al. |
| 2004/0062400 | A1 | 4/2004 | Sovio et al. |
| 2005/0154890 | A1 | 7/2005 | Vembu et al. |
| 2005/0251491 | A1 | 11/2005 | Medina et al. |
| 2008/0113687 | A1 | 5/2008 | Prendergast et al. |
| 2008/0261561 | A1 | 10/2008 | Gehrmann |
| 2010/0136967 | A1 * | 6/2010 | Du ........................ H04W 8/205 455/432.3 |
| 2010/0203864 | A1 | 8/2010 | Howard |
| 2010/0211781 | A1 | 8/2010 | Auradkar et al. |
| 2010/0266132 | A1 | 10/2010 | Bablani et al. |
| 2011/0099605 | A1 | 4/2011 | Cha et al. |
| 2011/0143782 | A1 | 6/2011 | Dowlatkhah |
| 2011/0225640 | A1 | 9/2011 | Ganapathy et al. |
| 2011/0246766 | A1 | 10/2011 | Orsini et al. |
| 2012/0129498 | A1 | 5/2012 | Morikuni et al. |
| 2012/0190354 | A1 | 7/2012 | Merrien et al. |
| 2012/0331292 | A1 | 12/2012 | Haggerty et al. |
| 2014/0073375 | A1 * | 3/2014 | Li ........................ H04W 4/001 455/558 |

FOREIGN PATENT DOCUMENTS

| | | |
|---|---|---|
| WO | 2005088932 | 9/2005 |
| WO | 2011109865 | 9/2011 |

OTHER PUBLICATIONS

PCT Search Report & Written Opinion for PCT application# PCT/CA2012/050465, Feb. 19, 2013.
Extended European Search Report issued in Ep Application No. 12880508.2 on Apr. 12, 2016; 11 pages.
GSMA; Embedded Sim Task Force Requirements and Use Cases; Feb. 21, 2011; 38 pages.
3GPP TR 33.812 V9.2.0 (Jun. 2010)3rd Generation Partnership Project; Technical Specification Group Services and System Aspects; Feasibility study on the security aspects of remote provisioning and change of subscription for Machine to Machine (M2M) equipment (Release 9); 87 pages.

* cited by examiner

METHODS AND APPARATUS FOR USE IN TRANSFERRING AN ASSIGNMENT OF A SECURE CHIP BETWEEN SUBSCRIPTION MANAGERS

BACKGROUND

Field of the Technology

The present disclosure relates to techniques for use in transferring an assignment of a secure chip (e.g. an Embedded Universal Integrated Circuit Card or eUICC) between subscription managers for wireless communication devices (e.g. cellular telephones, smartphones, etc.).

Description of the Related Art

For wireless communication devices, it may be desirable to transfer service subscriptions from one mobile network operator (MNO) to another MNO. The desire may exist, for example, where there is no direct relationship or trust between the different MNOs. The transfer of service subscriptions involves the provisioning of a secure chip of mobile equipment (ME). The secure chip may be one of many different types, such as an eUICC which is not intended to be disconnected from the ME.

It may also be desirable to provide an unlock mechanism so that, when the subscriber of the ME sells or otherwise gives the ME (i.e. with the secure chip) to another, the new owner may provision the secure chip with credentials from an MNO of their choice. Even further, one may wish to provide a (new) network access application (NAA) which provides authorization to the new network to allow an unlocked, but otherwise unprovisioned, secure chip to obtain credentials from the new MNO.

Techniques in these networks and environments may be suitable for use in other similar networks and environments.

BRIEF DESCRIPTION OF THE DRAWINGS

Embodiments of present disclosure will now be described by way of example with reference to attached figures, wherein.

DETAILED DESCRIPTION

Techniques for use in transferring an assignment of a secure chip of a wireless device from a current subscription manager (SM) of a current mobile network operator (MNO) to a new SM of a new MNO are described. In one illustrative example, the current SM receives a request for transferring the assignment and produces transfer permission data in response. The transfer permission data includes an identifier of the secure chip, an identifier of the current SM, and a digital signature of the current SM. The current SM then sends to the secure chip a transfer permission message which includes the transfer permission data. The transfer permission data indicates a permission for the secure chip to transfer the assignment from the current SM to the new SM.

Figure 1:
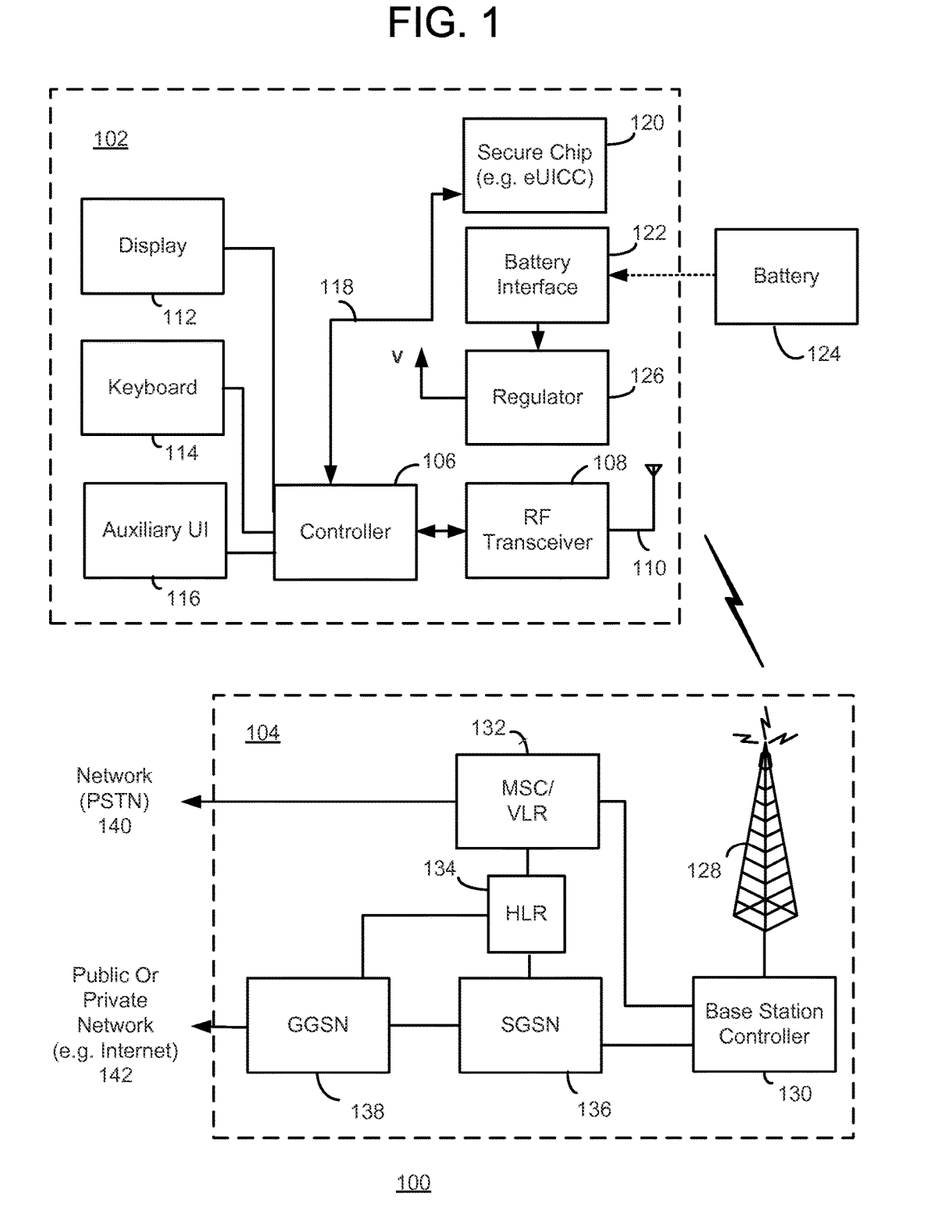
FIG. 1 is an illustrative representation of a communication system which includes a wireless device which communicates via a wireless communication network.

Example Environment. To illustrate an example system archtecture, FIG. 1 shows a block diagram of a communication system 100 which includes a wireless device 102 which communicates through a wireless communication network 104. Wireless device 102 may comprise a visual display 112, a keyboard 114, and perhaps one or more auxiliary user interfaces (UI) 116, each of which are coupled to a controller 106.

Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation of wireless device 102, whereas signal processing operations associated with communication functions are typically performed in RF transceiver circuitry 108.

Controller 106 interfaces with device display 112 to display received information, stored information, user inputs, and the like. Keyboard 114, which may comprise a telephone type keypad or full alphanumeric keyboard, is optionally provided for entering data for storage in wireless device 102, information for transmission to network 104, a telephone number to place a telephone call, commands to be executed on wireless device 102, and possibly other or different user inputs. Keyboard 114 may be substituted with a touch screen display or other suitable input mechanism, or enhanced or replaced with a voice-activated input module.

Wireless device 102 sends communication signals to and receives communication signals from network 104 over a wireless link via antenna 110. RF transceiver circuitry 108 performs functions similar to those of a base station 128 and a base station controller (BSC) 130 (described later below), including for example modulation/demodulation and possibly encoding/decoding and encryption/decryption. It is also contemplated that RF transceiver circuitry 108 may perform certain functions in addition to those performed by BSC 130. It will be apparent to those skilled in art that RF transceiver circuitry 108 will be adapted to the particular wireless network or networks in which wireless device 102 is intended to operate. When wireless device 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Wireless device 102 may comprise a battery interface 122 for receiving one or more (rechargeable) batteries 124. Battery 124 electrical power to electrical circuitry in wireless device 102, and battery interface 122 provides for a mechanical and electrical connection for battery 124. Battery interface 122 is coupled to a regulator 126 which regulates power to the device. Wireless device 102 may comprise a portable communication device (e.g. a handheld portable communication device), which includes a housing (e.g. a plastic housing) which carries and contains the electrical components of wireless device 102 including battery 124.

Wireless device 102 also operates using a secure chip 120 which is embedded in wireless device 102. Secure chip 120 is part of a "smart card" used to identify an end user (or subscriber) of wireless device 102 and to personalize the device, among other things. Secure chip 120 may be also or alternatively referred to as a secure element. Secure chip 120 generally includes a processor and a memory for storing information, and is coupled to controller 106 through communication lines 118. Without secure chip 120, the mobile station terminal (which may be referred to as mobile equipment or "ME") may not be fully operational for communications and services via wireless network 104. With secure chip 120 in wireless device 102, an end user of wireless device 102 has access to any and all of the subscribed services. Secure chip 120 may comprise, for example, a Universal SIM (USIM) or Removable User Identity Module (RUIM), or a Universal Integrated Circuit Card (UICC) or Embedded UICC (eUICC), or a secure element, etc. depending on the particular technology.

Note that the subscriber may be an end user consumer or, alternatively, the subscriber may be associated with an enterprise such as an employer managing a fleet of employee devices. In some embodiments, the techniques described herein may be used for changing the subscriptions of a plurality of devices, such as a group of employee devices in an enterprise.

Wireless device 102 may comprise a single unit, such as a data communication device, a cellular telephone, a multiple-function communication device with data and/or voice communication capabilities, a personal digital assistant (PDA) enabled for wireless communication, or a computer incorporating an internal modem. As mentioned earlier, wireless device 102 may comprise a portable communication device (e.g. a handheld portable communication device) which includes a housing (e.g. a plastic housing) which carries and contains the electrical components of wireless device 102. Alternatively, wireless device 102 may be a multiple-module unit comprising a plurality of separate components, including but in no way limited to a computer or other device connected to a wireless modem.

Further, depending on the functionality provided by wireless device 102, in various examples, wireless device 102 may be a multiple-mode communication device configured for both data and voice communication, a mobile telephone, such as a smartphone, a wearable computer such as a watch, a tablet computer such as a slate computer, a personal digital assistant (PDA), or a computer system. In some embodiments, wireless device 102 may comprise a vehicle such as a car or other automobile, a plane or other aircraft, a train, or a ship or other vessel, etc. Wireless device 102 may take other forms apart from those specifically listed above.

In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a wireless device 102 may have a more particular implementation as described later in relation to wireless device 201 of FIG. 2.

Wireless device 102 communicates in and through wireless network 104. Wireless network 104 may comprise a cellular telecommunications network. Wireless network 104 may be owned and/or operated by a wireless carrier (e.g. a mobile network operator, such as AT&T, Rogers Communications, T-Mobile, etc.) which provides a communication service (e.g. a voice telephony service and or packet data service) for mobile stations.

In the embodiment of FIG. 1, wireless network 104 is configured in accordance with Global Systems for Mobile communication (GSM) and General Packet Radio Service (GPRS) and technologies. Today, such a mobile station may further operate in accordance with Enhanced Data rates for GSM Evolution (EDGE) or Enhanced GPRS (EGPRS). Note that wireless network 104 may be based on any other suitable network technology or network, such as a Long-Term Evolution (LTE)-based network, an EVolution-Data Only (EV-DO)-based network, a UMTS-based network, or High Speed Packet Access (HSPA). Alternatively, wireless network 104 may comprise a wireless local area network (i.e. IEEE 802.11), a Bluetooth-based network, a WiMAX-based network (i.e. IEEE 802.16), or a Ultra-WideBand (UWB)-based network (i.e. IEEE 802.15), as a few examples.

In this environment, wireless network 104 may include a base station controller (BSC) 120 with an associated base station 128, a Mobile Switching Center (MSC) 132, a Home Location Register (HLR) 134, a Serving General Packet Radio Service (GPRS) Support Node (SGSN) 136, and a Gateway GPRS Support Node (GGSN) 138. MSC 132 is coupled to BSC 130 and to a landline network, such as a Public Switched Telephone Network (PSTN) 142. SGSN 136 is coupled to BSC 130 and to GGSN 138, which is in turn coupled to a public or private data network 142 (such as the Internet). HLR 134 is coupled to MSC 132, SGSN 136, and GGSN 138.

Station 128 is a fixed transceiver station, and station 128 and BSC 130 may be referred to as transceiver equipment. The transceiver equipment provides wireless network coverage for a particular coverage area commonly referred to as a "cell". The transceiver equipment transmits communication signals to and receives communication signals from mobile stations within its cell via station 128. The transceiver equipment normally performs such functions as modulation and possibly encoding and/or encryption of signals to be transmitted to the mobile station in accordance with particular, usually predetermined, communication protocols and parameters, under control of its controller. The transceiver equipment similarly demodulates and possibly decodes and decrypts, if necessary, any communication signals received from wireless device 102 within its cell. Communication protocols and parameters may vary between different networks. For example, one network may employ a different modulation scheme and operate at different frequencies than other networks.

For all wireless devices 102 registered with a network operator, permanent data (such as wireless device 102 user's profile) as well as temporary data (such as mobile station's 102 current location) are stored in HLR 134. In case of a voice call to wireless device 102, HLR 134 is queried to determine the current location of wireless device 102. A Visitor Location Register (VLR) of MSC 132 is responsible for a group of location areas and stores the data of those mobile stations that are currently in its area of responsibility. This includes parts of the permanent mobile station data that have been transmitted from HLR 134 to the VLR for faster access. However, the VLR of MSC 132 may also assign and store local data, such as temporary identifications. Optionally, the VLR of MSC 132 can be enhanced for more efficient co-ordination of GPRS and non-GPRS services and functionality (e.g. paging for circuit-switched calls which can be performed more efficiently via SGSN 136, and combined GPRS and non-GPRS location updates).

Serving GPRS Support Node (SGSN) 136 is at the same hierarchical level as MSC 132 and keeps track of the individual locations of mobile stations. SGSN 136 also performs security functions and access control. Gateway GPRS Support Node (GGSN) 138 provides interworking with external packet-switched networks and is connected with SGSNs (such as SGSN 136) via an IP-based GPRS backbone network. SGSN 136 performs authentication and cipher setting procedures based on algorithms, keys, and criteria (e.g. as in existing GSM). In conventional operation, cell selection may be performed autonomously by wireless device 102 or by the transceiver equipment instructing wireless device 102 to select a particular cell. Wireless device 102 informs wireless network 104 when it reselects another cell or group of cells, known as a routing area.

In order to access GPRS services, wireless device 102 first makes its presence known to wireless network 104 by performing what is known as a GPRS "attach". This operation establishes a logical link between wireless device 102 and GGSN 136 and makes wireless device 102 available to receive, for example, pages via SGSN, notifications of incoming GPRS data, or SMS messages over GPRS. In order to send and receive GPRS data, wireless device 102 assists in activating the packet data address that it wants to use. This operation makes wireless device 102 known to GGSN 138; interworking with external data networks can thereafter commence. User data may be transferred transparently between wireless device 102 and the external data networks using, for example, encapsulation and tunneling. Data packets are equipped with GPRS-specific protocol information and transferred between wireless device 102 and GGSN 138.

Figure 2:
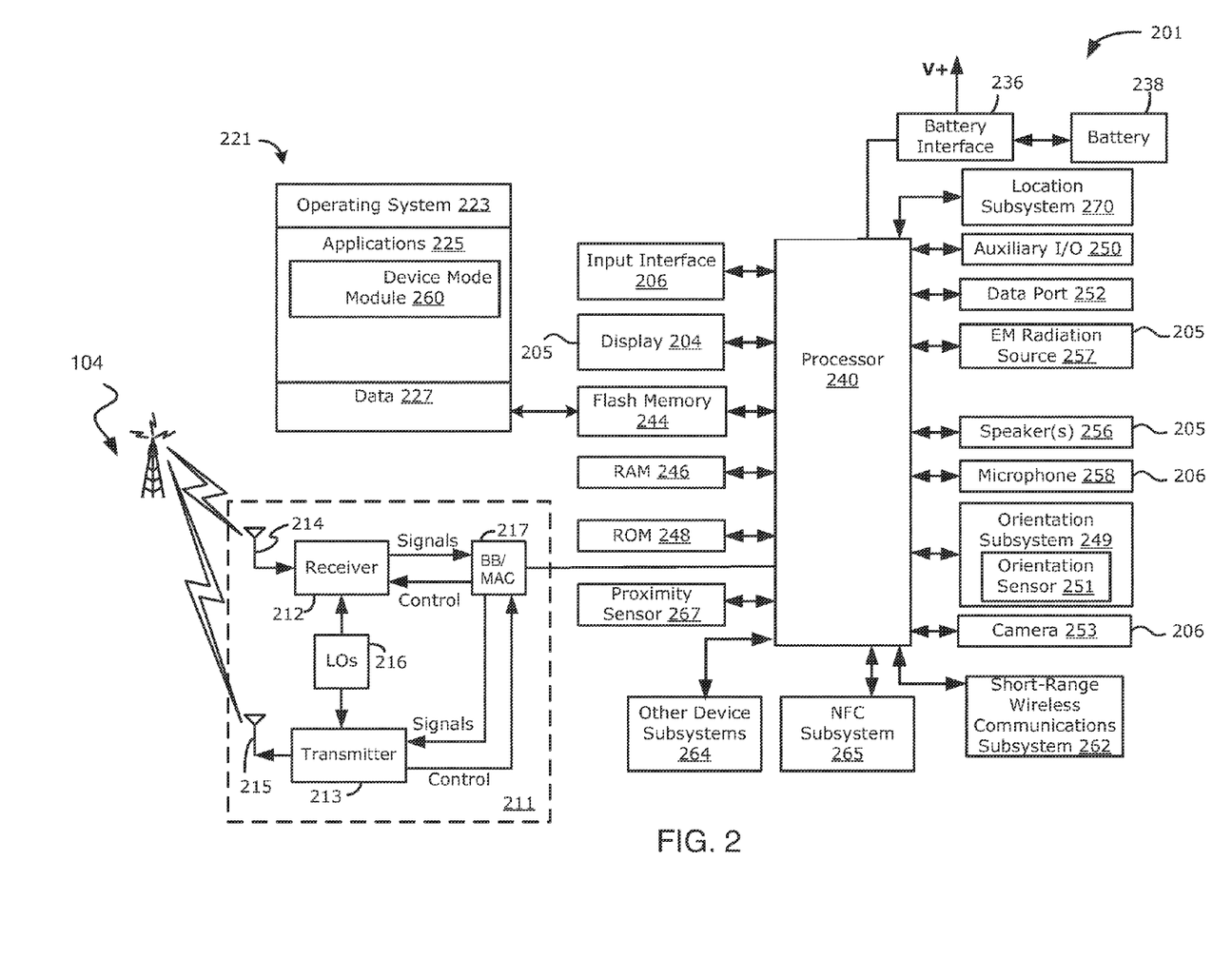
FIG. 2 is an example of a schematic block diagram of a particular wireless device of FIG. 1.

Reference will now be made to FIG. 2 which illustrates one example of a schematic block diagram of a wireless device 201, which may comprise a wireless device 102 of FIG. 1. In the illustrated example, wireless device 201 is a communication device and, more particularly, is a mobile communication device having data and voice communication capabilities, and configured to communicate with other computer systems (e.g., via the Internet). It will, however, be appreciated that wireless device 201 may take other forms.

Depending on the functionality provided by wireless device 201, in various examples, wireless device 201 may be a multiple-mode communication device configured for both data and voice communication, a mobile telephone, such as a smartphone, a wearable computer such as a watch, a tablet computer such as a slate computer, a personal digital assistant (PDA), or a computer system. In some embodiments, wireless device 201 may comprise a vehicle such as a car or other automobile, a plane or other aircraft, a train, or a ship or other vessel, etc. Wireless device 201 may take other forms apart from those specifically listed above. The electronic device may also be referred to as a mobile communications device, a communication device, a mobile device and, in some cases, as a device.

Wireless device 201 includes a controller including one or more processors 240 (such as a microprocessor) which controls the overall operation of wireless device 201. The processor 240 interacts with device subsystems such as a wireless communication subsystem 211 for exchanging radio frequency signals with wireless network 104 to perform communication functions. The processor 240 is communicably coupled with additional device subsystems including one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown)) associated with a touchscreen display 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a near field communications (NFC) subsystem 265, a short-range wireless communication subsystem 262 and other device subsystems generally designated as 264. Some of the subsystems shown in FIG. 2 perform communication-related functions, whereas other subsystems may provide "resident" or on-device functions.

In at least some examples, wireless device 201 may include a touchscreen display which acts as both an input interface 206 (i.e., touch-sensitive overlay) and an output interface 205 (i.e., display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller. In at least some examples, the touch-sensitive overlay may have a touch-sensitive input surface which is larger than the display 204. For example, in at least some examples, the touch-sensitive overlay may extend overtop of a frame 312 (of FIG. 3) which surrounds the display 204. In such example, the frame 312 (of FIG. 3) may be referred to as an active frame since it is capable of acting as an input interface 206. In at least some examples, the touch-sensitive overlay may extend to the sides of wireless device 201.

As noted above, in some examples, wireless device 201 may include a communication subsystem 211 which allows wireless device 201 to communicate over wireless network 104. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to wireless device 201 and a single antenna may be shared by both receiver and transmitter. The particular design of the wireless communication subsystem 211 depends on wireless network 104 in which wireless device 201 is intended to operate.

In at least some examples, wireless device 201 may communicate with any one of a plurality of base stations of wireless network 104 within its geographic coverage area. Wireless device 201 may send and receive communication signals over wireless network 104 after the required network registration or activation procedures have been completed. Signals received by the antenna 214 through wireless network 104 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to wireless network 104 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some examples, the auxiliary input/output (I/O) subsystems 250 may include an external communication link or interface; for example, an Ethernet connection. Wireless device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on wireless device 201 such as receipt of an electronic communication or incoming phone call, or for other purposes such as haptic feedback (touch feedback).

The data port 252 may be used for synchronization with a user's host computer system (not shown). The data port 252 enables a user to set preferences through an external device or software application and extends the capabilities of wireless device 201 by providing for information or software downloads to wireless device 201 other than through wireless network 104. The alternate download path may for example, be used to load an encryption key onto wireless device 201 through a direct, reliable and trusted connection to thereby provide secure device communication.

In at least some examples, wireless device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some examples, the orientation sensor 251 is an accelerometer, such as a three-axis accelerometer. An accelerometer is a sensor which converts acceleration from motion (e.g., movement of the device 201 or a portion thereof due to the strike force) and gravity which are detected by a sensing element and converted into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of wireless device 201. The orientation data, in at least some examples, specifies the orientation of the device 201 relative to the gravitational field of the earth.

In some examples, the orientation subsystem 249 may include other orientation sensors 251, instead of or in addition to accelerometers. For example, in various examples, the orientation subsystem 249 may include a gravity sensor, a gyroscope, a tilt sensor, an electronic compass or other suitable sensor, or combinations thereof. In some examples, the device orientation subsystem 249 may include two or more orientation sensors 251 such as an accelerometer and an electronic compass.

Wireless device 201 may, in at least some examples, include a near field communications (NFC) subsystem 265. The NFC subsystem 265 is configured to communicate with other wireless devices 201 and/or tags, using an NFC communications protocol. NFC is a set of short-range wireless technologies which typically require a distance of 4 cm or less for communications. The NFC subsystem 265 may include an NFC chip and an NFC antenna.

Wireless device 201 may include a microphone and/or one or more speakers. In at least some examples, wireless device 201 may include a plurality of speakers 256. For example, in some examples, wireless device 201 may include two or more speakers 265. The two or more speakers 256 may, for example, be disposed in spaced relation to one another. That is, in at least some examples, wireless device 201 may include a first speaker and a second speaker and the first speaker and the second speaker may be spatially separated from one another within wireless device 201. In at least some examples, the display 204 may be disposed between the first speaker and the second speaker of the electronic device. In such example, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display. In at least some examples, each speaker 256 may be associated with a separate audio channel. The multiple speakers may, for example, be used to provide stereophonic sound (which may also be referred to as stereo).

Wireless device 201 may also include one or more cameras 253. The one or more cameras 253 may be capable of capturing images in the form of still photographs or motion video. In at least some examples, wireless device 201 includes a front facing camera 253. A front facing camera 253 is a camera which is generally located on a front face of wireless device 201. The front face is typically the face on which a display 204 is mounted. That is, the display 204 is configured to display content which may be viewed from a side of wireless device 201 where the camera 253 is directed. The front facing camera 253 may be located anywhere on the front surface of the electronic device; for example, the camera 253 may be located above or below the display 204. Alternatively, or additionally, camera 253 may be located on a rear face of wireless device 201. The camera 253 may be a fixed position camera which is not movable relative to the display 204 of wireless device 201 and/or the housing of wireless device 201. In such examples, the direction of capture of the camera is always predictable relative to the display 204 and/or the housing. In at least some examples, the camera may be provided in a central location relative to the display 204 to facilitate image acquisition of a face.

In at least some examples, wireless device 201 includes an electromagnetic (EM) radiation source 257. In at least some examples, the EM radiation source 257 is configured to emit electromagnetic radiation from the side of the electronic device which is associated with a camera 253 of that wireless device 201. For example, where the camera is a front facing camera 253, wireless device 201 may be configured to emit electromagnetic radiation from the front face of wireless device 201. That is, in at least some examples, the electromagnetic radiation source 257 is configured to emit radiation in a direction which may visible by the camera. That is, the camera 253 and the electromagnetic radiation source 257 may be disposed on wireless device 201 so that electromagnetic radiation emitted by the electromagnetic radiation source 257 is visible in images obtained by the camera.

In some examples, the electromagnetic radiation source 257 may comprise an infrared (IR) radiation source which is configured to emit infrared radiation. In at least some examples, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some examples, the camera 253 is configured to capture at least some electromagnetic radiation which is not in the visible spectrum.

In some examples, wireless device 201 is provided with a service routing application programming interface (API) which provides an application with the ability to route traffic through a serial data (i.e., USB) or BLUETOOTH® (BLUETOOTH® is a registered trademark of Bluetooth SIG, Inc.) connection to a host computer system using standard connectivity protocols. When a user connects their wireless device 201 to the host computer system via a USB cable or BLUETOOTH® connection, traffic that was destined for wireless network 104 is automatically routed to wireless device 201 using the USB cable or BLUETOOTH® connection. Similarly, any traffic destined for wireless network 104 is automatically sent over the USB cable BLUETOOTH® connection to the host computer system for processing.

Wireless device 201 may also include a battery 238 as a power source, which is typically one or more rechargeable batteries that may be charged for example, through charging circuitry coupled to a battery interface 236 such as the data port 252. The battery 238 provides electrical power to at least some of the electrical circuitry in wireless device 201, and the battery interface 236 provides a mechanical and electrical connection for the battery 238. The battery interface 236 is coupled to a regulator (not shown) which provides a regulated voltage V to the circuitry for powering wireless device 201.

Wireless device 201 includes a short-range communication subsystem 262 which provides for wireless communication between wireless device 201 and other wireless devices 201. The short-range communication subsystem 262 may be used to provide a preferred device mode between wireless device 201 and another wireless device 201 which may, in at least some examples, be a wireless device which is the same or similar to wireless device 201 discussed with reference to FIG. 1. In at least some examples, the short-range communication subsystem 262 is a wireless bus protocol compliant communication mechanism such as a BLUETOOTH® communication module to provide for communication with similarly-enabled systems and devices.

Wireless device 201 stores data 227 in an erasable persistent memory, which in one example is the flash memory 244. In various examples, the data 227 includes service data including information required by wireless device 201 to establish and maintain communication with wireless network 104. The data 227 may also include user application data such as email messages, address book and contact information, calendar and schedule information, notepad documents, image files, and other commonly stored user information stored on wireless device 201 by its user, and other data. The data 227 stored in the persistent memory (e.g., flash memory 244) of wireless device 201 may be organized, at least partially, into one or more databases or data stores. The databases or data stores may contain data items of the same data type or associated with the same application. For example, email messages, contact records, and task items may be stored in individual databases within the device memory.

Wireless device 201 may, in some examples, may comprise a mobile communication device which may provide a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of wireless device 201 may also compose data items, such as email messages; for example, using the input devices in conjunction with the display 204. These composed items may be transmitted through the communication subsystem 211 over wireless network 104.

In the voice communication mode, wireless device 201 provides telephony functions and generally operates as a cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on wireless device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 2, the software modules 221 include operating system software 223 and other software applications 225 such as device mode module 260. In the example of FIG. 2, the device mode module 260 is implemented as a stand-alone application 225. However, in other examples, the device mode module 260 could be implemented as part of the operating system 223 or another application 225.

The software applications 225 on wireless device 201 may also include a range of additional applications, including for example, a notepad application, Internet browser application, voice communication (i.e., telephony) application, mapping application, or a media player application, or any combination thereof. Each of the software applications 225 may include layout information defining the placement of particular fields and graphic elements (e.g., text fields, input fields, icons, etc.) in the user interface (e.g., the display 204) according to the application.

The software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

A set of applications that control basic device operations, including data and possibly voice communication applications will normally be installed on wireless device 201 during or after manufacture. Additional applications and/or upgrades to the operating system 223 or software applications 225 may also be loaded onto wireless device 201 through wireless network 104, the auxiliary I/O subsystem 250, the data port 252, the short-range communication subsystem 262, or other suitable subsystem 264. The downloaded programs or code modules may be permanently installed; for example, written into the program memory (i.e., the flash memory 244), or written into and executed from the RAM 246 for execution by the processor 240 at runtime.

Figure 3:
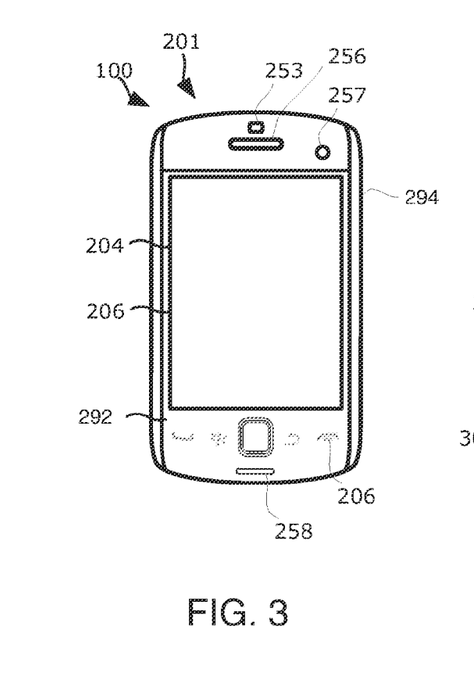
FIGS. 3 and 4 are some examples of different types of wireless devices of the present disclosure, which include a smartphone (FIG. 3) and a tablet computer (FIG. 4)

Example Smartphone Electronic Device. Referring now to FIG. 3, a front view of an example wireless device 201 which is a smartphone 300 is illustrated. The smartphone 300 is a mobile phone which offers more advanced computing capability than a basic non-smartphone cellular phone. For example, the smartphone 300 may have the ability to execute third party applications which are stored on the smartphone.

The smartphone 300 may include the components discussed above with reference to FIG. 2 or a subset of those components. The smartphone 300 includes a housing 294 which houses at least some of the components discussed above with reference to FIG. 2.

In the example illustrated, the smartphone includes a display 204, which may comprise a touchscreen display which acts as an input interface 206. The display 204 is disposed within the smartphone 300 so that it is viewable at a front side 292 of the smartphone 300. That is, a viewable side of the display 204 is disposed on the front side 292 of the smartphone. In the example illustrated, the display 204 is framed by the housing 294.

The example smartphone 300 also includes other input interfaces 206 such as one or more buttons, keys or navigational input mechanisms. In the example illustrated, at least some of these additional input interfaces 206 are disposed for actuation at the front side 292 of the smartphone.

The example smartphone also includes a speaker 256. In the example illustrated, the smartphone includes a single speaker 256 which is disposed vertically above the display 204 when the smartphone 300 is held in a portrait orientation where its height is longer than its width. The speaker 256 may be disposed on the front face of the smartphone 300.

While the example smartphone 300 of FIG. 3 includes a single speaker 256, in other examples, the smartphone 300 may include a greater number of speakers 256. For example, in at least some examples, the smartphone 300 may include a second speaker 256 which is disposed vertically below the display 204 when the smartphone is held in a portrait orientation where its height is longer than its width (i.e., the orientation illustrated in FIG. 3).

The example smartphone 300 also includes a microphone 258. In the example illustrated, the microphone 258 is vertically disposed below the display 204 when the smartphone is held in the portrait orientation. The microphone 258 and at least one speaker 256 may be arranged so that the microphone is in close proximity to a user's mouth and the speaker 256 is in close proximity to a user's ear when the user holds the phone to their face to converse on the smartphone.

The example smartphone 300 also includes a front facing camera 253 which may be located vertically above the display 204 when the smartphone 300 is held in a portrait orientation where its height is longer than its width. The front facing camera 253 is located so that it may capture images of objects which are located in front of and/or surrounding the front side of the smartphone 300.

The example smartphone 300 also includes an electromagnetic radiation source 257. The electromagnetic radiation source 257 is disposed on the front side 292 of the smartphone 300. In this orientation, electromagnetic radiation which is produced by the electromagnetic radiation source 257 may be projected onto objects which are located in front of and/or surrounding the front side of the smartphone 300. Such electromagnetic radiation (or the projection of electromagnetic radiation onto objects) may be captured on images obtained by the camera 253.

Figure 4:
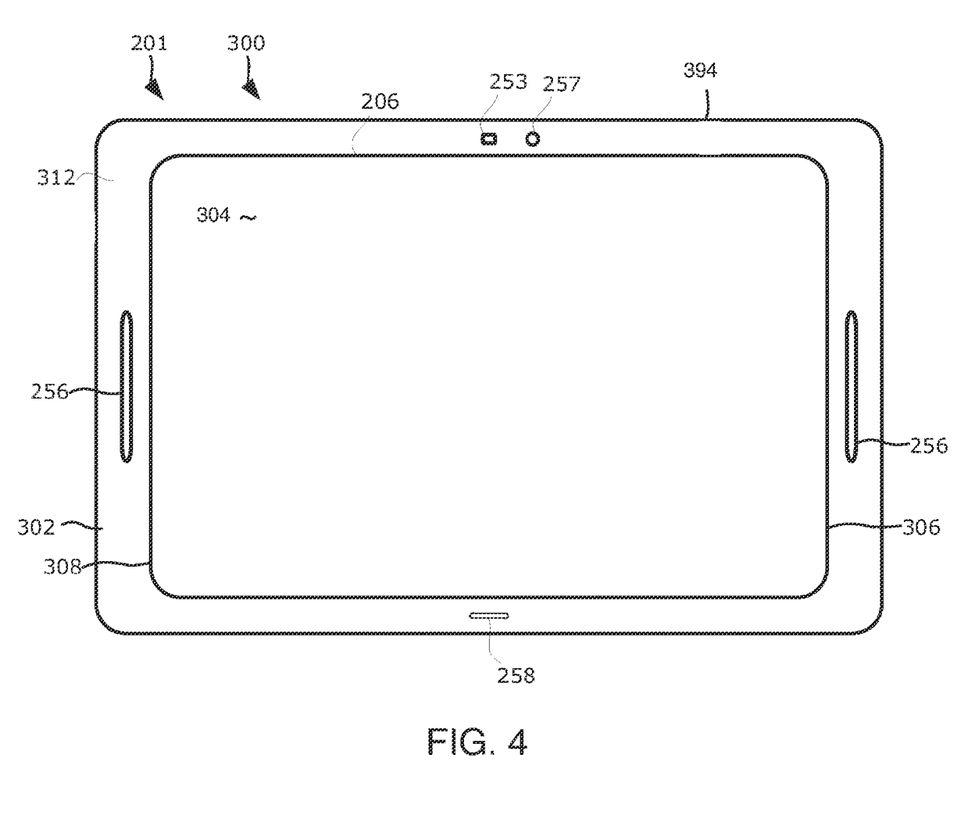

Example Tablet Electronic Device. The wireless device may comprise a tablet computer 400 ("tablet"), one of which is illustrated in FIG. 4. Tablet computer 400 of FIG. 4 may include many of the same features and components of the smartphone 300 of FIG. 3. However, tablet computer 400 of FIG. 4 is generally larger than the smartphone 300 of FIG. 3. Tablet computer 400 may include the components discussed above with reference to FIG. 2 or a subset of those components. Tablet computer 400 includes a housing 394 which houses at least some of the components discussed above with reference to FIG. 2.

Tablet computer 400 includes a display 304, which may comprise a touchscreen display which acts as an input interface 206. The display 304 is disposed within tablet computer 400 so that it is viewable at a front side 302 of tablet computer 400. That is, a viewable side of the display 304 is disposed on the front side 302 of tablet computer 400. In the example illustrated, the display 304 is framed by the housing 394, with use of a frame 312 which surrounds the display 304. The frame 312 is portion of the housing 394 which provides a border around the display 304. In at least some examples, the frame 312 is an active frame 312. That is, the frame has a touch sensitive overlay which allows wireless device 201 to detect a touch applied to the frame, thereby allowing the frame 312 to act as an input interface 206 (of FIG. 2).

The example tablet computer 400 includes a plurality of speakers 256. In the example illustrated, the tablet includes two speakers 256. The two speakers 256 are disposed on opposing sides of the display 304. More particularly, when tablet computer 400 is oriented in a landscape orientation (such as the orientation illustrated in FIG. 4) where its width is longer than its height, one of the two speakers is disposed on a right side 306 of the display 304 and one of the speakers is disposed on the left side 308 of the display 304. Both speakers 256 are disposed on the front side 302 of tablet computer 400.

The example tablet computer 400 also includes a microphone 258. In the example illustrated, the microphone 258 is vertically disposed below the display 304 when the tablet computer is held in the landscape orientation illustrated in FIG. 4. The microphone 258 may be located in other locations in other examples.

The example tablet computer 400 also includes a front facing camera 253 which may be located vertically above the display 304 when tablet computer 400 is oriented in a landscape orientation (i.e., the orientation of FIG. 3). The front facing camera 253 is located so that it may capture images of objects which are located in front of and/or surrounding the front side of tablet computer 400.

The example tablet computer 400 also includes an electromagnetic radiation source 257. The electromagnetic radiation source 257 is disposed on the front side 304 of tablet computer 400. In this orientation, electromagnetic radiation which is produced by the electromagnetic radiation source 257 may be projected onto objects which are located in front of and/or surrounding the front side 302 of tablet computer 400. Such electromagnetic radiation (or the projection of electromagnetic radiation onto objects) may be captured on images obtained by the camera 253.

Figure 5:
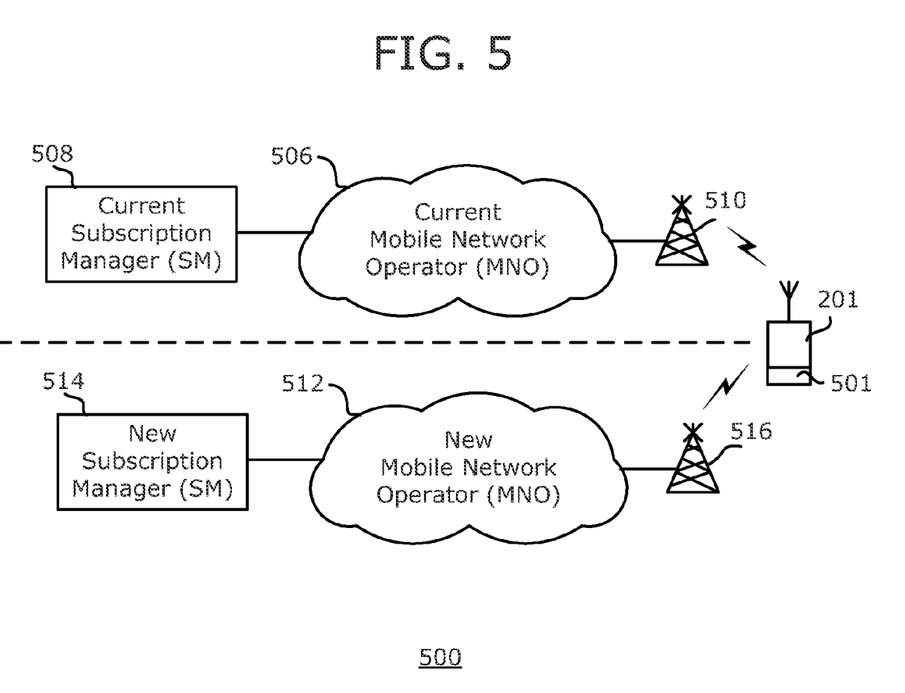
FIG. 5 is a communication system in which assignment of a secure chip of the wireless device is transferred from a current subscription manager (SM) of a current mobile network operator (MNO) to a new SM of a new MNO.

Reference is now made to FIG. 5, which depicts a communication system 500 in which assignment of a secure chip of the wireless device is transferred from a current subscription manager (SM) of a current mobile network operator (MNO) to a new SM of a new MNO. In some examples, secure chip 501 comprises an Embedded Universal Integrated Circuit Card (eUICC). Distinctions between an eUICC and a UICC include the following. An eUICC is phyiscally attached (e.g. soldered) to the ME, whereas the UICC is removable. Also, the owner of the ME will be the owner of the eUICC. A subscription manager (SM) entity is defined, which has credentials allowing the "remote" modification of profiles that contain NAAs on an eUICC. Note that the original motivation for eUICC was centered around machine type communications (called M2M, MTM, or MTC typically—herein "M2M").

As an example, it would be desirable to phase "smart meters" and other M2M devices out of UICCs and into eUICCs. Examples of smart meters include utility (e.g., electricity, water, gas, etc.) meters. Examples of other machines include security cameras. Indeed, changing the subscription associated with the meters requires manually changing UICCs, which is costly and time consuming. Unlike UICCs (which are provisioned prior to being combined with the ME), eUICCs may be provisioned after being combined with the ME.

The GSMA has defined a "subscription manager" function which has the capability to perform such provisioning:

It shall be possible for the SM to manage network access and applications/services on behalf of the MNO on the eUICC in accordance with the defined policy control functions.

By allowing a subscription manager to manage eUICCs OTA (or through a physical connection to the device), changes to NAA or a profile may be done remotely.

Profiles are the logical entities transferred from a SM to a secure chip, entities that include all of the necessary credentials and secrets required for the wireless device to access the network. The "secrets" are contained in the network access application (NAA) and/or network access credentials (NAC). In order to install profiles through a wired connection (e.g. USB) or wireless connection (over-the-air or "OTA"), the SM needs the necessary credentials (i.e. Profile Installer Credentials and Profile Management Credentials) associated with the secure chip.

This management is enabled by means of credentials (Profile Installer Credentials, and Profile Management Credentials) stored at the SM and known by the eUICC. This secret information may be generated at the point of eUICC manufacture provided by the eUICC manufacturer to the SM, for example. It is important to note that the ownership of and responsibility for the SM are not defined, though it is expected that in at least some cases, the SM will be owned and/or controlled by a network operator. While ownership of UICCs typically remained with the network operator, this is likely to change for eUICCs, such that ownership of the physical hardware is likely to be tied to that of the ME, but control (by means of the SM) is retained by the network operator.

These eUICCs, although originally intended for M2M devices and applications, will most likely migrate to all types of wireless terminals including handsets.

FIG. 5 is a depiction of a communication system 500 within which the present techniques may be practiced. Wireless device 201 includes a secure chip 501 (see e.g. discussion in relation to FIG. 1). Wireless device 201 may initially be subscribed to communication services of a mobile network operator (MNO) 506 which includes or is associated with a subscription manager (SM) 508. Thus, MNO 506 may be referred to as a current MNO, and SM 508 may be referred to as a current SM. Secure chip 501 is initially assigned to current SM 508 for subscription management.

Current MNO 506 has and operates a wireless communication network 510 within which wireless device 201 may communicate and receive these communication services (e.g. see FIGS. 1 and 2). Current SM 508, which may be implemented as one or more servers, is accessible by wireless device 201 via wireless communication network 510. Current SM 508 is configured to manage operational profiles and provisioning profiles on secure chips of a plurality of wireless devices (e.g. secure chip 501 of wireless device 201) that are subscribed to the communication services of MNO 506. Note that current MNO 506 and SM 508 may be or be part of the same entity or actor.

The subscriber of wireless device 201 may wish to change the subscription of communication services from current MNO 506 to a new MNO 512 which includes or is associated with a new SM 514. To facilitate such a change, an assignment of secure chip 501 may be transferred from current SM 508 of current MNO 506 to new SM 514 of new MNO 512 with use of techniques of the present disclosure.

Like current MNO 506, new MNO 512 has and operates a wireless communication network 516 within which wireless device 201 may communicate and receive its communication services (e.g. see FIGS. 1 and 2). Like current SM 508, new SM 514 is configured to manage operational profiles and provisioning profiles on secure chips of a plurality of wireless devices that are subscribed to the communication services of new MNO 512. Note that new MNO 512 and new SM 514 may be or be part of the same entity or actor.

Figure 6:
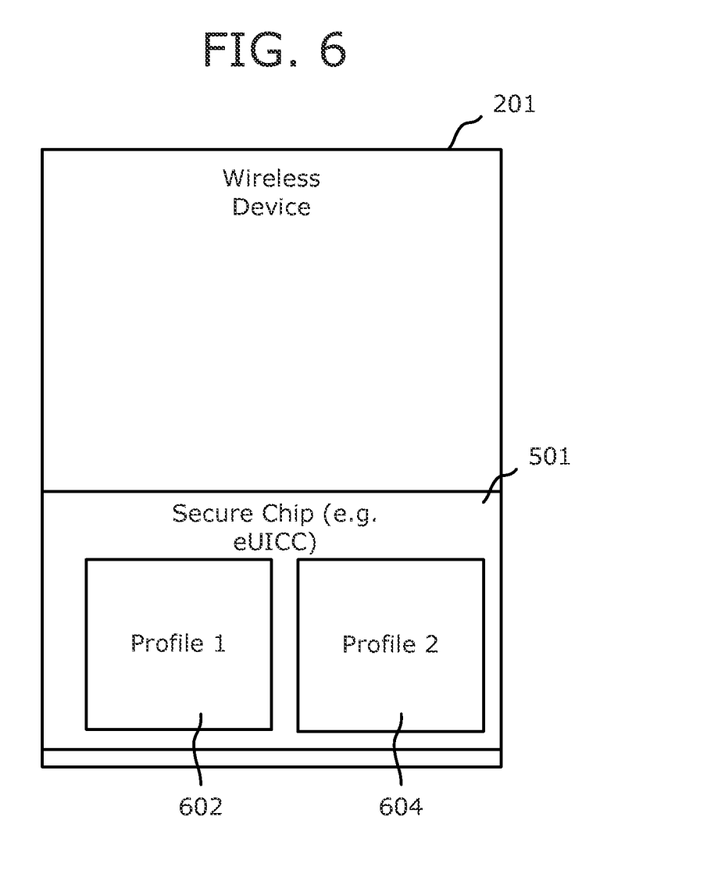
FIG. 6 is a block diagram of the wireless device which includes the secure chip (e.g. an Embedded Universal Integrated Circuit Card or "UICC") for storing one or more operational profiles for the current and/or new SMs.

FIG. 6 is a block diagram of the wireless device 201 having secure chip 501 which is configured to receive and store one or more profiles 602 and 604. In some examples, secure chip 501 comprises an Embedded UICC (eUICC). Profile 602 may be associated with the current MNO (e.g. current MNO 506 of FIG. 5) and profile 604 may be associated with the new MNO (e.g. new MNO 512 of FIG. 5). Any one of profiles 602 and 604 may be enabled at any given time, and operation may require that only a single one of these profiles be enabled at a time.

The profiles may be or include operational profiles and/or provisioning profiles. An operational profile generally comprises a profile containing one or more network access applications and associated network access credentials. A provisioning profile generally comprises a profile containing one or more network access applications, and associated network access credentials which, when installed on a secure chip, enables access to one or more networks, provides transport capability for secure chip management and profile management between the secure chip and the SM.

Figure 7:
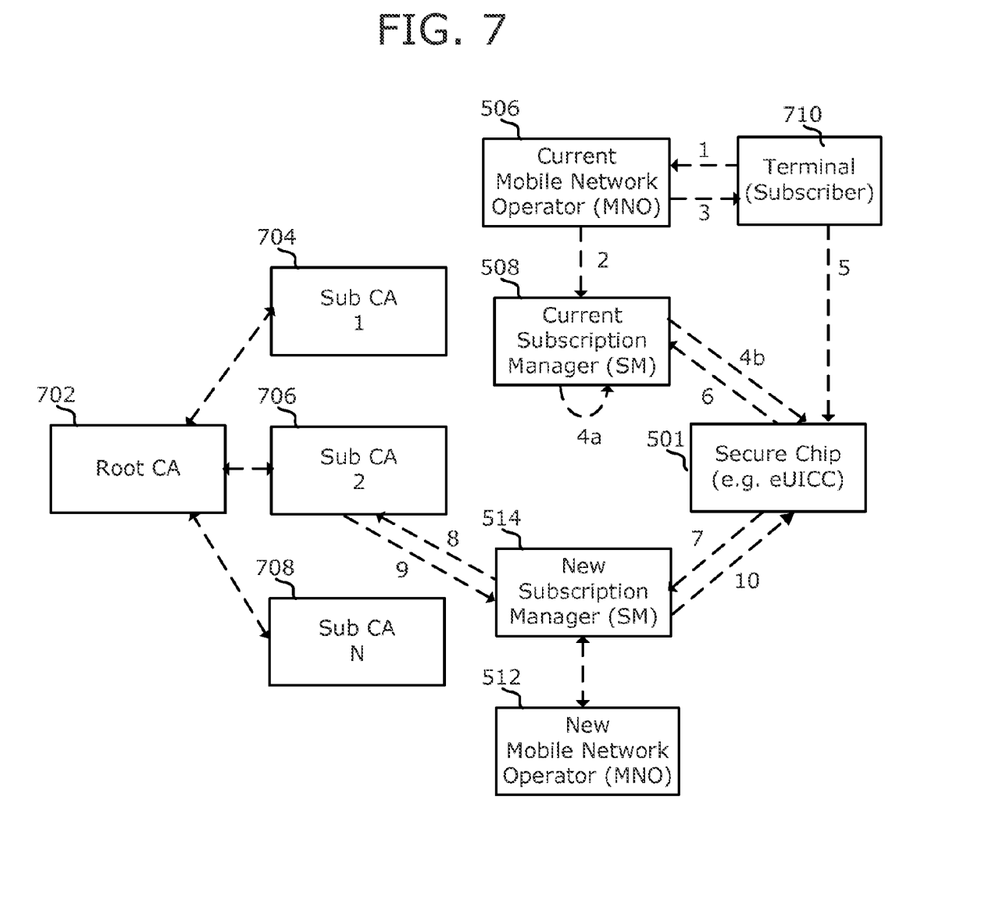
FIG. 7 is a block diagram for describing a technique for use in transferring an assignment of the secure chip of a wireless device from a current SM of a current mobile network operator to the new SM of the new mobile network operator.
Figure 8:
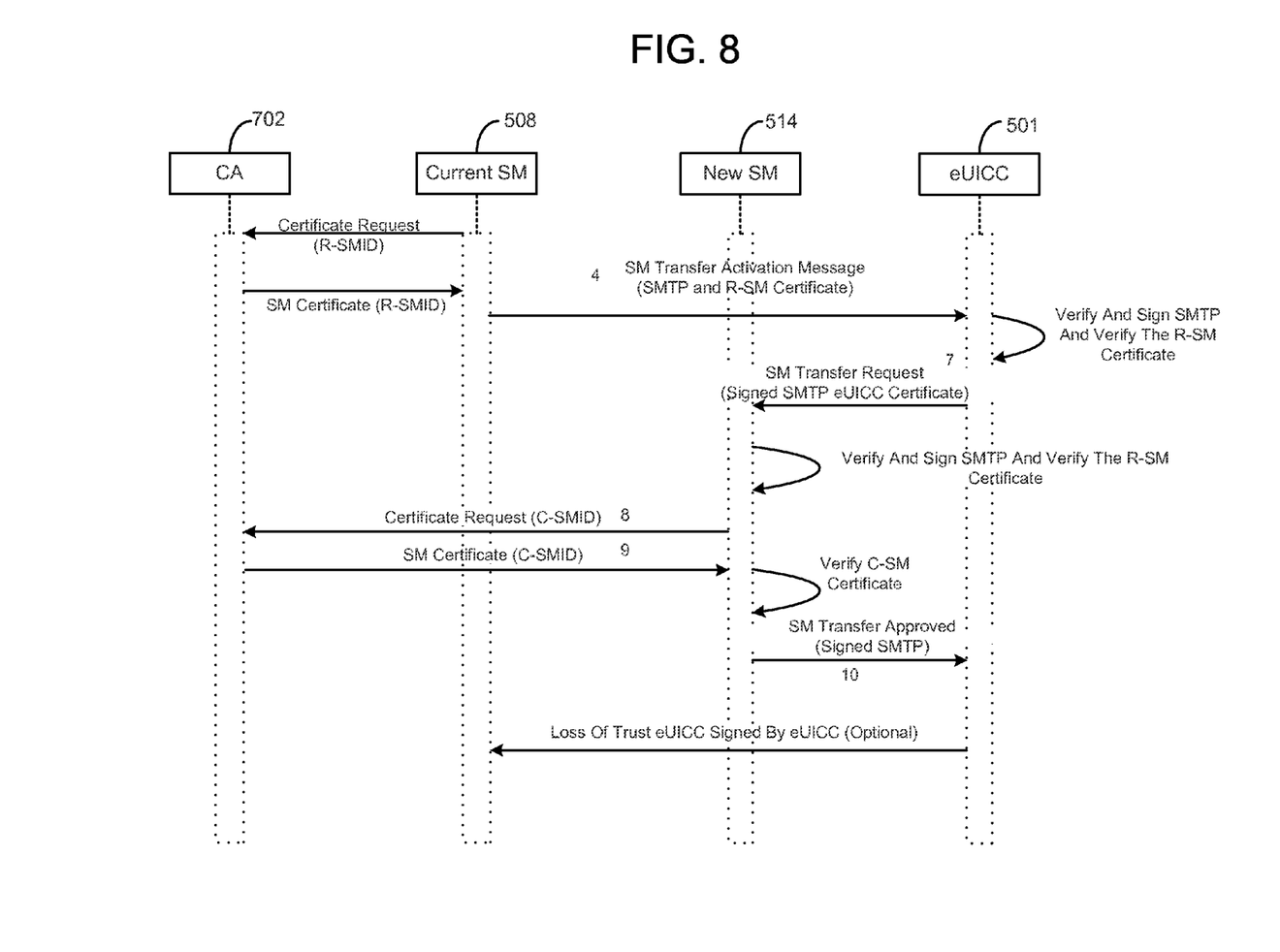
FIG. 8 is a process flow diagram for describing a part of the technique of FIG. 7.

FIG. 7 is a block diagram for describing a method for use in transferring of assignment of a secure chip of a wireless device from a current SM of a current MNO to a new SM of a new MNO. Along with FIG. 7, FIG. 8 is a process flow diagram for describing a portion of the same technique of FIG. 7. FIG. 8 particularly illustrates the interaction between SMs and one or more certificate authorities (CA) 702, 704, 706, and 708. Note that there may be various CA subauthorities 704, 706, and 708, which interact with the CA 702.

Note that the various techniques provided herein may be embodied as a computer program product which comprises a computer readable medium (e.g. memory, computer disk, etc.) and computer instructions stored in the computer readable medium, where the computer instructions are executable by one or more processors of a secure chip, the SM (e.g. a server thereof), or other device, etc. for use in transferring an assignment of the secure chip of the wireless device from the current SM to the new SM.

A first part of the technique in steps 1-5 of FIGS. 7-8 may be referred to as "subscription manager transfer activation". Such activation gives current MNO 506 the ability to allow or reject a subscriber request for subscription transfer through an activation process for the requested subscription change. A second part of the technique in steps 6-10 may be referred to as "subscription manager pivot protocol". Such protocol is configured to facilitate a transfer of trust between current SM 506 and new SM 514, even without direct communication between them.

Prior to the technique, current SM 508 obtains its public key/private key pair and its digital certificate which includes the public key signed (directly or indirectly) by a root of trust (ROT). Secure chip 501 obtains or is configured with a public key of the ROT to perform signature verification, and obtains or configured with a digital certificate of current SM 508.

A terminal 702, which may comprise a computer terminal or PC, may be utilized by the subscriber to interact with current MNO 506. Current MNO 506 may provide a server (e.g. the MNO's web portal) for terminals, such as terminal 702, to interact with over a public or private network (e.g. the Internet).

In response to an input request from the subscriber, terminal 702 sends a request for transferring an assignment of SMs (i.e. subscription transfer) to the server of current MNO 506 (step 1 of FIG. 7). The request may include an identity of the subscriber, an identity of secure chip 501, or both. The request may additionally include an identity of the new SM 514, the digital certificate of new SM 514, the identity of the new MNO 512, or combinations thereof.

In response to receiving the request, the current MNO 506 obtains a digital certificate of the new SM 514. Current MNO 506 may obtain the digital certificate of the new SM 514 from terminal 702, or from a global digital certificate repository using the identity of the new MNO 512, as examples.

The server of current MNO 506 performs a check to identify whether the subscription transfer is allowed for the subscriber. If the subscription transfer is allowed, then current MNO 506 sends a corresponding request for the subscription transfer to the current SM 514 (step 2 of FIG. 7). The corresponding request at least includes an identifier of secure chip 501 for which the subscription transfer is being made. The corresponding request may additionally include the identifier of new SM 514, the digital certificate of new SM 514, or both. Alternatively, the new SM may be unspecified, and intended for open-ended selection.

The digital certificate of new SM 514 may include an identifier of new SM 514 (e.g. a globally unique SM ID) and a public key of new SM 514. In addition, the digital certificate of new SM 514 may include a provisioning profile of new MNO 512 of new SM 514. A provisioning profile generally comprises a profile containing one or more network access applications and associated network access credentials. When installed on a secure chip, such profile enables access to one or more networks, and provides transport capability for secure chip management and profile management between the secure chip and the SM. In combination with the digital certificate of secure chip 501, the digital certificate of new SM 514 is used to establish a secure channel to manage the secure chip 501. The digital certificate of new SM 514 is also used for verification of the signature of new SM 514 (i.e. verification of the SMTP in the second part of the technique in steps 6-10 which is referred to as the subscription manager pivot protocol).

Even further, current MNO 506 may generate and additionally include a transfer activation code in the corresponding request to current SM 508. This transfer activation code may comprise a one-time and/or a time-limited code. Current MNO 506 may also send the transfer activation code to terminal 710 for displaying the code to the subscriber.

Current MNO 506 then sends an acceptance message to terminal 710, providing an indication at terminal 710 that secure chip 501 will be allowed to transfer to a new MNO (step 3 of FIG. 7). The acceptance message may include the transfer activation code.

If the subscription transfer is disallowed, then current MNO 506 refrains from sending the corresponding request for the subscription transfer to the current SM 508 in step 2 of FIG. 7. Current MNO 506 sends a reject message to terminal 710, providing an indication at terminal 710 that secure chip 501 will not be allowed to transfer to a new MNO.

In response to receiving the corresponding request in step 2 of FIG. 7, current SM 508 proceeds to produce transfer permission data (step 4a of FIG. 7). The transfer permission data may be alternatively referred to as a "subscription manager transfer permit" (SMTP). The transfer permission data indicates a permission for secure chip 501 to transfer the assignment from a current SM (e.g. current SM 506) to a new SM (e.g. new SM 514).

The transfer permission data may include an identifier of secure chip 501, an identifier of current SM 506, and a digital signature of current SM 508. The transfer permission data may further include an identifier of new SM 514. In this step 4a of FIG. 7, current SM 508 binds the identifier of secure chip 501, the identifier of current SM 508, and (optionally) the identifier of SM 514, by signing one of these items using its private key, for producing this transfer permission data.

Current SM 508 then sends to secure chip 501 a transfer permission message which includes the transfer permission data (step 4b of FIG. 7). The transfer permission message may be alternatively referred to as an "SM transfer activation message". The transfer permission message may include an identifier of new SM 514, a digital certificate of new SM 514, or both. The transfer permission message may additionally include the transfer activation code.

Secure chip 501 verifies the digital certificate of new SM 514 using the public key of the ROT. Secure chip 501 also verifies the signature of the current SM 506 in the transfer permission data using the digital certificate of current SM 506.

If these items are positively verified, then secure chip 501 may cause an input prompt to be produced at the wireless device. The input prompt is provided to prompt the subscriber to enter the transfer activation code. This may be performed through use of a (smart card) web server which executes a (trusted) web application, for example. Next, terminal 710 receives a code via user input from the subscriber, and the web application sends a transfer verification message to secure chip 501 which includes the subscriber entered code. Secure chip 501 receives the entered code, and compares it with the transfer activation code. If there is a match, secure chip 501 allows the second part of the technique to be performed in steps 6-10. In this case, the transfer activation code is then no longer valid. If there is no match, secure chip 501 disallows the second portion of the technique of steps 6-10.

Note that if a transfer activation code is not required, or the transfer permission message does not include a transfer activation code, the input prompt may prompt for an acknowledgement from the subscriber without prompting for any code. Here, for example, the input prompt may ask the subscriber to confirm that SM transfer is desired.

Again, the second part of the technique in steps 6-10 may be referred to as a subscription manager pivot protocol. Such protocol is configured to facilitate a transfer of trust between current SM 506 and new SM 514, even without direct communication between them. Previous to these steps, secure chip 501 obtains a public/private key pair and a digital certificate for itself, which is signed by the ROT. Secure chip 501 also obtains and validates the digital certificate of the new SM 514.

In response to the secure chip 501 receiving the transfer permission message in step 4, or in response to the subscriber inputting a matching code in step 5, secure chip 501 signs the transfer permission data using its private key. Secure chip 501 then sends the signed transfer permission data and its digital certificate to new SM 514 in a transfer request message.

The digital certificate of secure chip 501 may include an identifier of secure chip 501 (e.g. a globally unique eUICC ID) and a public key of secure chip 501. The digital certificate of secure chip 501 is used to establish a secure channel with secure chip 501. The digital certificate of secure chip 501 is also used for verification of the signature (i.e. verification of the SMTP in the second part of the technique in steps 6-10 which is referred to as the subscription manager pivot protocol).

The transfer request message may alternatively be referred to as an "SM transfer request message". New SM 514 uses these items to establish connectivity and transmit the transfer request message to new SM 514 (step 7 of FIGS. 7-8).

New SM 514 obtains the digital certificate of the current SM 506 (step 8 of FIGS. 7 and 8). The digital certificate may be obtained with use of the identity of the current SM 506, or source ID in the transfer permission data. The digital certificate may be obtained from, for example, the certificate repository (e.g. subauthority CA 706). Subauthority CA 706 responds to new SM 514 with the digital certificate of current SM 508 (step 9 of FIGS. 7-8).

New SM 514 receives the digital certificate of secure chip 501 and verifies it. New SM 514 also verifies the signed permission transfer data using the digital certificate of secure chip 501. Further, new SM 514 also verifies the encapsulated transfer permission data using the digital certificate of new SM 514. New SM 514 stores the digital certificate of secure chip 501 in association with the identity of secure chip 501. New SM 514 notifies new MNO 512 of the gain of trust for a new secure chip 501. New SM 514 produces a transfer acknowledgement message and sends it to secure chip 501 (step 10 of FIGS. 7-8). The transfer acknowledgement message may be produced by new SM 514 by signing the identity of secure chip 501, the identity of current SM 508, and the identity of new SM 514.

New SM 514 and secure chip 501 then communicate via the wireless network, and perform an authentication procedure with use of their digital certificates. The public key in each digital certificate (e.g. the profile management credentials) are used by new SM 514 and secure chip 501 to produce a session key over which new SM 514 may provision secure chip 501 with appropriate data. New SM 514 performs a provisioning procedure with secure chip 510 to send secure chip 510 one or more profiles. Secure chip 510 stores these profiles for network access. In particular, new SM 514 provisions secure chip 501 with the operational profile of new MN 512.

In at least some embodiments, signaling to enable trusted third part control of trust between a secure chip and different SMs is reduced. Other advantages are readily apparent to those of ordinary skill in the art.

As described herein, techniques for use in transferring an assignment of a secure chip of a wireless device from a current subscription manager (SM) of a current mobile network operator (MNO) to a new SM of a new MNO have been described. In one illustrative example, the current SM receives a request for transferring the assignment and produces transfer permission data in response. The transfer permission data includes an identifier of the secure chip, an identifier of the current SM, and a digital signature of the current SM. The current SM then sends to the secure chip a transfer permission message which includes the transfer permission data. The transfer permission data indicates a permission for the secure chip to transfer the assignment from the current SM to the new SM.

Another technique is for use in a secure chip of a wireless device for facilitating a transfer of assignment of the secure chip from a current subscription manager (SM) of a current mobile network operator (MNO) to a new SM of a new MNO. The secure chip receives, from the current SM, a transfer permission message which includes transfer permission data. The transfer permission data includes an identifier of the current SM and a digital signature of the current SM. The secure chip verifies the digital signature of the current SM. The secure chip also sends, to the new SM, a transfer request message which includes the transfer permission data, an identifier of the new SM, and a digital signature of the secure chip.

Yet even another technique for use in transferring an assignment of a secure chip of a wireless device from a current subscription manager (SM) of a current mobile network operator (MNO) to a new SM of a new MNO is provided. The new SM receives from the secure chip a transfer request message which includes a transfer permission message and a digital signature of the secure chip. The transfer permission message includes transfer permission data having an identifier of the current SM and a digital signature of the current SM. The new SM verifies in the transfer request message the digital signature of the secure chip. The new SM also verifies in the transfer permission data the digital signature of the current SM. If the digital signatures are positively verified, then the secure chip is assigned to the new SM.

The above-described embodiments of the present disclosure are intended to be examples only. Those of skill in the art may affect alterations, modifications and variations to the particular embodiments without departing from the scope of the application. The invention(s) described herein in the recited claims intend to cover and embrace all suitable changes in technology.

What is claimed is:

1. A method comprising:

storing a first profile and a second profile at a secure chip of a wireless device, the first profile including data for accessing a first network and the second profile including data for accessing a second network, the first profile and the second profile being active one at a time, the first profile being active such that the wireless device is initially in communication with the first network, and the second profile being inactive such that the wireless device is initially not in communication with the second network;

receiving a message from a server at the secure chip, the message causing a profile switch such that the first profile is deactivated and the second profile is activated, the message comprising a permission for the secure chip to transfer an assignment of a server of the first network to a respective server of the second network; and using the second profile, after receipt of the message from the server, to establish communication between the secure chip and the second network, wherein the message further comprises transfer permission data, and the using the second profile to establish communication between the secure chip and the second network comprises sending, to the respective server of the second network, a transfer request message comprising the transfer permission data, an identifier of the respective server of the second network, and a digital signature of the secure chip.

2. The method of claim 1, further comprising before the storing, receiving another message comprising at least one of the first and second profiles.

3. The method of claim 1, wherein the message further comprises an identifier of the server and a digital signature of the server, the method further comprising verifying the digital signature of the server prior to the establishing communication between the secure chip and the second network using the second profile.

4. The method of claim 1, further comprising: receiving a digital certificate of the respective server of the second network; and verifying the digital certificate of the respective server of the second network.

5. The method of claim 4, further comprising sending a transfer request message to the respective server of the second network only when the digital signature is positively verified by the secure chip.

6. The method of claim 1, further comprising receiving a transfer activation code from the server of the first network.

7. The method of claim 1, wherein the secure chip is an Embedded Universal Integrated Circuit Card (eUICC).

8. A wireless device comprising:

a secure chip, and a processor configured to:

store a first profile and a second profile at the secure chip, the first profile including data for accessing a first network and the second profile including data for accessing a second network, the first profile and the second profile being active one at a time, the first profile being active such that the wireless device is initially in communication with the first network, and the second profile being inactive such that the wireless device is initially not in communication with the second network;

receive a message from a server at the secure chip, the message causing a profile switch such that the first profile is deactivated and the second profile is activated, the message comprising a permission for the secure chip to transfer an assignment of a server of the first network to a respective server of the second network; and use the second profile, after receipt of the message from the server, to establish communication between the secure chip and the second network, wherein the message further comprises transfer permission data, and the using the second profile to establish communication between the secure chip and the second network comprises sending, to the respective server of the second network, a transfer request message comprising the transfer permission data, an identifier of the respective server of the second network, and a digital signature of the secure chip.

9. The device of claim 8, wherein the processor is further configured to, before the first profile and the second profile are stored at the secure chip, receive another message comprising at least one of the first and second profiles.

10. The device of claim 8, wherein the message further comprises an identifier of the server and a digital signature of the server, the processor further configured to verify the digital signature of the server prior to establishment of communication between the secure chip and the second network using the second profile.

11. The device of claim 8, the processor is further configured to: receive a digital certificate of the respective server of the second network; and verify the digital certificate of the respective server of the second network.

12. The device of claim 11, the processor is further configured to send a transfer request message to the respective server of the second network only when the digital signature is positively verified by the secure chip.

13. The device of claim 8, the processor is further configured to receive a transfer activation code from the server of the first network.

14. The device of claim 8, wherein the secure chip is an Embedded Universal Integrated Circuit Card (eUICC).

15. A non-transitory computer-readable medium storing a computer program, wherein execution of the computer program is for:

storing a first profile and a second profile at a secure chip of a wireless device, the first profile including data for accessing a first network and the second profile including data for accessing a second network, the first profile and the second profile being active one at a time, the first profile being active such that the wireless device is initially in communication with the first network, and the second profile being inactive such that the wireless device is initially not in communication with the second network;

receiving a message from a server at the secure chip, the message causing a profile switch such that the first profile is deactivated and the second profile is activated, the message comprising a permission for the secure chip to transfer an assignment of a server of the first network to a respective server of the second network; and using the second profile, after receipt of the message from the server, to establish communication between the secure chip and the second network, wherein the message further comprises transfer permission data, and the using the second profile to establish communication between the secure chip and the second network comprises sending, to the respective server of the second network, a transfer request message comprising the transfer permission data, an identifier of the respective server of the second network, and a digital signature of the secure chip.

16. The non-transitory computer-readable medium of claim 15, wherein execution is further for before the storing, receiving another message comprising at least one of the first and second profiles.

17. The non-transitory computer-readable medium of claim 15, wherein the message further comprises an identifier of the server and a digital signature of the server, wherein execution is further for verifying the digital signature of the server prior to the establishing communication between the secure chip and the second network using the second profile.

18. The non-transitory computer-readable medium of claim 15, wherein execution is further for receiving a digital certificate of the respective server of the second network; and verifying the digital certificate of the respective server of the second network.

19. The non-transitory computer-readable medium of claim 18, wherein execution is further for sending a transfer request message to the respective server of the second network only when the digital signature is positively verified by the secure chip.

20. The non-transitory computer-readable medium of claim 15, wherein execution is further for receiving a transfer activation code from the server of the first network.

21. The non-transitory computer-readable medium of claim 15, wherein the secure chip is an Embedded Universal Integrated Circuit card.

* * * * *